United States Patent [19]

Fitzsimmons et al.

[11] Patent Number: 5,630,504
[45] Date of Patent: May 20, 1997

[54] COMPACT DISC PACKAGE WITH PLASTIC TRAY

[76] Inventors: W. Tyler Fitzsimmons, 22 Ocean View Ave., South Portland, Me. 04106; Anthony L. Gelardi, P.O. Box 213, Cape Porpoise, Me. 04014

[21] Appl. No.: 641,271

[22] Filed: Apr. 30, 1996

Related U.S. Application Data

[63] Continuation of Ser. No. 362,968, Dec. 23, 1994, abandoned.

[51] Int. Cl.⁶ .................................................. B65D 85/57
[52] U.S. Cl. .................................. 206/308.1; 206/313
[58] Field of Search ........................... 206/308.1–308.3, 206/309–313

[56] References Cited

U.S. PATENT DOCUMENTS

| | | | |
|---|---|---|---|
| 4,176,744 | 12/1979 | Borzak | 206/310 X |
| 4,327,831 | 5/1982 | Inaba et al. . | |
| 4,488,645 | 12/1984 | Yamaguchi . | |
| 4,635,792 | 1/1987 | Yamada et al. . | |
| 4,674,632 | 6/1987 | Friedman . | |
| 4,709,812 | 12/1987 | Kosterka . | |
| 4,718,553 | 1/1988 | Adamoli et al. . | |
| 4,718,557 | 1/1988 | Friedman . | |
| 4,807,749 | 2/1989 | Ackeret | 206/309 X |
| 4,881,640 | 11/1989 | Herr et al. . | |
| 4,899,875 | 2/1990 | Herr et al. . | |
| 4,941,575 | 7/1990 | Friedman . | |
| 4,972,953 | 11/1990 | Friedman et al. . | |
| 4,982,846 | 1/1991 | Friedman . | |
| 5,028,076 | 7/1991 | Danelski . | |
| 5,188,230 | 2/1993 | O'Brien et al. . | |
| 5,205,405 | 4/1993 | O'Brien et al. . | |
| 5,219,417 | 6/1993 | O'Brien et al. . | |
| 5,248,032 | 9/1993 | Sheu et al. . | |
| 5,282,917 | 2/1994 | Danelski . | |
| 5,284,242 | 2/1994 | Roth et al. . | |
| 5,332,089 | 7/1994 | Tillett et al. . | |
| 5,333,728 | 8/1994 | O'Brien et al. . | |
| 5,333,732 | 8/1994 | Bundy et al. . | |
| 5,366,074 | 11/1994 | O'Brien et al. . | |
| 5,372,253 | 12/1994 | O'Brien et al. . | |
| 5,379,890 | 1/1995 | Mahler | 206/310 |
| 5,402,882 | 4/1995 | Bandy et al. | 206/310 |

FOREIGN PATENT DOCUMENTS

| | | |
|---|---|---|
| 420350A1 | 3/1991 | European Pat. Off. . |
| 2266514A | 11/1993 | United Kingdom . |

OTHER PUBLICATIONS

Exhibit 1 —a copy of a product on the market.

*Primary Examiner*—Bryon P. Gehman
*Attorney, Agent, or Firm*—James Creighton Wray

[57] ABSTRACT

A compact disc container uses a plastic tray, a paperboard which is mechanically locked to the tray, and a clasp to hold the paperboard cover closed. Corner sections of the tray have elongated openings along outer walls to receive tabs which are bent up at right angles from a base panel of the board. The tabs are then bent inward over ribs in the corner section, and arcuate inner surfaces of the tabs lie against outer surfaces of segmental walls in the tray. Retainers hold the arcuate surfaces of the tabs downward. The outside of the tabs may be printed with the outside of the base and the cover, since the outside surfaces of the tabs appear within the tray. A spline panel extends from the base panel to the cover. The cover has an outer panel and an inner panel which are printed before they are folded and bonded. A second page is folded from an inward end of the inner panel. The fold between the inner panel and the second page acts as a spring, opening the cover and separating the second page from the inner panel when the cover is released. A clasp is received in an opening in the front wall of the tray. Projections from the tray are received within openings in the clasp, and arms extend into the front wall for holding the clasp over a closed cover. The forward edge of the cover has a curved cutout which matches a curved edge of a downward step within the lid of the cover to prevent lateral cover movement while the lid holds the cover closed. Sliding or rocking the clasp outward releases the cover.

19 Claims, 6 Drawing Sheets

COMPACT DISC PACKAGE WITH PLASTIC TRAY

This application is a continuation of Ser. No. 08/362,968, filed Dec. 23, 1994, now abandoned.

BACKGROUND OF THE INVENTION

This invention relates to packages for compact discs.

Compact discs are conventionally stored in multiple-part clear plastic cases called Jewel cases. The cases often have a base, a tray inserted in the base with a rosette for gripping the inner opening of a compact disc, and a cover hinged to the base. Jewel cases are expensive and require other packaging materials, such as inserts, covers or boards for carrying graphics. The Jewel cases may be separated from the graphics once they are opened.

Because compact discs have long been popular, replacing tapes and records for audio reproductions, storage equipment for Jewel cases has been largely developed.

Attempts have been made to replace the Jewel cases with less expensive packages made out of combinations of plastic and paperboard.

Needs exist to provide improved plastic and paperboard combined packages for compact discs. The needs are particularly accelerated and emphasized by the current expansion of use of compact discs as read only memories, ROM's, for computers.

SUMMARY OF THE INVENTION

The invention provides new parts for a new CD package. One element of the invention is a new paperboard and plastic tray CD package for storing compact discs and the like. The new package has several new main parts. A paperboard folder, a disc tray, and a removable clasp, and cover booklet are new. The paperboard folder has at least two panels. One panel, on which the disc holder is attached, has extensions projecting upward from the edges of the panel. The extensions extend through openings at corners of the tray and fold inward to snap between corner ribs and lugs, tightly capturing the tray. The remaining panel overlies the top of the holder, serving as the cover of the package. The movable clasp is snapped into a wall of the holder and secures the overlying panels to the holder.

The present invention is a plastic tray and paperboard combination package for compact discs. The try may be molded in a clear or solid opaque material. There are many paperboard options: from single ply, single sided printing, single panel cover, two panel, two sided printing, and a variety of cover panel/booklet combinations. One board configuration creates a two-page cover. The first page is the cover itself, and the second page is just inside of the cover. The second page can be printed on both sides or just one side, and can be a single or double ply board. The fold of the second page is next to the cover fold. When the cover is released to open, the spring memory of the second page fold forces the cover partially open. The use of the board's inherent memory to open the cover is important. The second page falls within the tray side walls. That provides lateral stability and alignment for the cover, preventing it from moving side to side when in the closed position. The cap also provides stability in that way.

The tray and board are mechanically attached. There are four quarter tabs on the edges of the board which are inserted through slots at the corresponding edges of the tray. The quarter tabs are folded upward then inward around the body of the tray to lay flat on the top of tray corners. Secured by small latches, the quarter tabs are retained downward, keeping the board attached to the tray. The top sides of the tabs which are exposed at the corners of the tray are the same side as the outside of the package. Printing only one side of the board enables one use graphics on the outside of the package and on the inside of the package, with either a clear or solid tray at no extra printing cost. When the tray is molded in clear material one can print on the sides of the quarter tabs between the two folds to provide side graphics visible through the clear tray sides. Additional tabs can be added to the front end of the sides, providing full height graphics on the front end of the sides. Inside the package, the area below a clear tray can be used for more graphics by printing on both sides of the bottom panel. Another graphic option is to mold into the floor of the tray lenticular lenses which, when used with multi-image printed material, create a double image.

A board clasp mechanically attaches to the tray. When snapped to the side of the tray, the clasp pivots to secure the cover closed. Two bumps on the sides snap within the opening in the front wall. Because the clasp protrudes higher than the sides of the tray, the cap has been designed to fold beyond upright, into the tray. That drops the height of the clasp below the level of the sides, allowing the trays to stack evenly prior to attaching the board. The clasp, being a separate piece, can be molded in any color and detached from the tray for recycling. Another option is to take the same type of clasp and attach it from above versus the front. Another option is to slide the clasp in and out.

The present invention provides a simple and secure way to mechanically attach a graphics board to a tray. That feature provides the ability to decorate the inside of the tray while using an opaque colored tray. With a clear tray one can decorate virtually every side of the package, with one board printed on one side. Apart from its decorating features, the package can be made in any material. Its features are not dependent upon using polypropylene for a living hinge. Impact resistant materials such as polystyrene and ABS can be used for applications which demand a durable resilient material. Although polypropylene is also durable, the new product when molded in alternative material will not suffer from the soft flexible feel and warping issues common to polypropylene. Non-polypropylene material characteristics such as rigidity, flatness and perceived value are seen and appreciated in the Jewel box. The pack offers the same characteristics without the breaking disadvantages.

There is a need for the new product primarily in the computer market for packaging CD-ROM discs. Other markets include packaging of audio CD's and photographs on compact discs.

Interest in the new invention will come from printers and other paperboard decorators who will become CD package manufacturers by purchasing or molding trays. Interest in the CD packaging market will expand, particularly in the paper industry, as the paper/plastic combination becomes accepted. Plastic molders will also be interested in this product.

A compact disc container uses a plastic tray, a paperboard which is mechanically locked to the tray, and a clasp to hold the paperboard cover closed. Corner sections of the tray have elongated openings along outer walls to receive tabs which are bent up at right angles from a base panel of the board. The tabs are then bent inward over ribs in the corner section, and arcuate inner surfaces of the tabs lie against outer surfaces of segmental walls in the tray. Retainers hold the arcuate surfaces of the tabs downward. The outside of the tabs may be printed with the outside of the base and the cover, since the outside surfaces of the tabs appear within the tray. A spline panel extends from the base panel to the cover. The cover has an outer panel and an inner panel which are printed before they are folded and bonded. A second page is folded from an inward end of the inner panel. The fold between the inner panel and the second page acts as a spring, opening the cover and separating the second page from the inner panel when the cover is released. A clasp is received in an opening in the front wall of the tray. Projections from the tray are received within openings in the clasp, and arms extend into the front wall for holding the clasp over a closed cover. The forward edge of the cover has a curved cutout which matches a curved edge of a downward step within the lid of the cover to prevent lateral cover movement while the lid holds the cover closed. Sliding or rocking the clasp outward releases the cover.

A preferred CD package apparatus has a molded plastic tray. A paperboard panel has a base panel attached to the tray, which has a spline panel overlying an end of the tray and a cover panel overlying the tray. A clasp is connected to a front of the tray for engaging a front edge portion of the cover and holding the cover closed.

A preferred CD tray has a base and outer walls extending upward from the base. Segmental inner walls extend upward from the base near intersections of the outer walls. The segmental walls define a generally circular area for receiving a compact disc. Ribs transverse to the segmental walls and outer walls in areas between the outer walls and segmental walls, and openings in the base receive tab projections. Detents on the segmental walls engage the tab projections.

The outer walls include opposite spline and front walls, and opposite openings in the spline and front walls for accessing edges of compact discs stored in the trays.

A clasp is attached to the front wall at the opening therein and is movable to a position generally closing the opening and engaging a portion of a front edge of a graphics card covering the tray.

The clasp is pivoted at the front wall of the tray. The clasp has parallel arms which extend beyond the front wall. Ramped knobs extend outward from extremities of the arms for grasping an inside of the front wall when the clasp is pivoted upward to close the opening.

The clasp is sized to fit entirely within the front opening for rotating the clasp inward in the tray around the pivot and positioning the clasp entirely beneath an upward limit of the tray.

The front wall of one embodiment of the tray has two auxiliary arm-receiving openings, and the clasp has two forward extending arms which extend into the arm-receiving openings. Ramped primary knobs at distal ends of the arms prevent removal of the clasp from the openings, and secondary knobs on intermediate portions of the arms hold the arms inward for permitting the arms to slide outward until the primary or terminal knobs contact the tray around the openings.

Auxiliary walls extend between the outer walls and the segmental walls around the front opening. Primary detents in the auxiliary walls and secondary detents on ends of the arms engage the primary detents for limiting travel of the arms.

One clasp has a base and an aperture parallel to the base. The tray has a projection which fits in the aperture and traps the aperture while permitting rotation with respect to the base. The tray has a groove and the clasp has a rounded base for fitting within the groove. Another clasp has two apertures parallel to the base. Projections extend from the base to engage the apertures and to restrict pivoting of the clasp within the groove.

A paperboard panel for a CD package has a base panel for engaging the tray. The base panel has extensions with folds for extending into openings in a tray and folding within the tray for mechanically attaching the base panel to the tray. The paperboard has a spline panel connected to a spline edge of the base panel and a cover connected to a top edge of the spline panel.

The base extensions have arcuate terminal edges for engaging segmental walls of a tray on an inside of the tray.

The extensions have opposite long and short parallel edges for respectively lying along inner surface of outer walls of the tray and surface of internal walls in the tray.

The cover has an outer panel and an inner panel joined by a fold parallel to and opposite the fold at the top of the spline panel, and the outer and inner panels of the cover are permanently joined together.

The folded edge dividing the outer and inner panels of the cover, which is remote from the fold at the top edge of the spline, has a central curvilinear cutout portion for receiving an inner complementary curvilinear portion of a clasp.

A preferred cover apparatus for a combined plastic tray and paperboard panel CD package has an outer panel joined to a fold at a top of the spline panel. An inner panel is folded with respect to the outer panel remote from the spline and bonded to an inner surface of the outer panel. A second page is hinged to the inner panel along an edge thereof near the spline for providing a spring lifting the cover and separating the second page from the inner panel as the cover is released.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
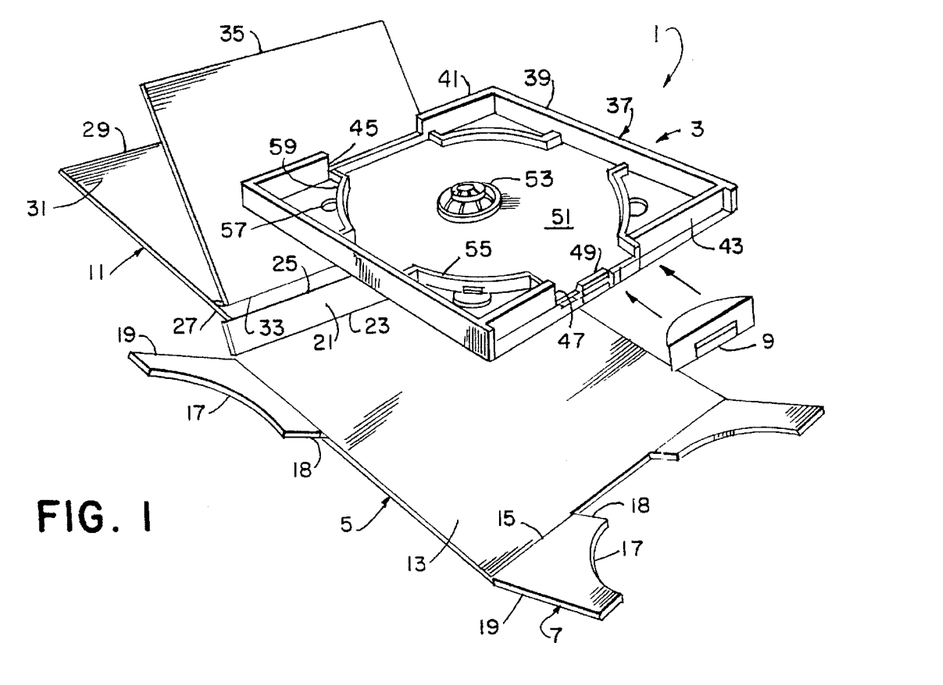
FIG. 1 is an exploded view of parts of the package.

Referring to the FIG. 1, a CD package is generally indicated by the numeral 1. The package includes a molded polystyrene tray 3 which is rigid and durable, and a paperboard 5 which is mechanically attached to the tray with printed tabs 7 which are an integral part of the board. A clasp 9 is connected to the tray to hold the cover 11 closed on the top of the tray. The board 5 has a single ply base 13, to which tabs 7 are joined by folds 15. The tabs have arcuate inner surface 17, relatively long outer surfaces 19, and short inner surface 18.

A spline panel 21 is joined to the base panel 13 by a fold 23. Fold 25 at the top of the spline panel joins the outer cover panel 27 to the spline. A fold 29 at the opposite end of the spline joins an inner panel 31 to the outer cover panel 27. The inner and outer cover panels are bonded together to form the unitary cover 11.

A fold 33 at the inside edge of the inner panel joins a second page 35, which may be a single panel or double panels adhesively bonded together. The fold 33 and the particular arrangement of the second page causes the second page 35 to separate from the inner panel 31 and from the cover 11, lifting the cover when the cover is released by the clasp 9. The tray 3 has outer walls 37 which include parallel opposite side walls 39, a spline wall 41 and a front wall 43. The spline wall and front wall have central openings 45 and 47 through which fingers can be inserted to lift the CD while contacting only the edge. A receiver 49 at the bottom of the front opening 47 receives and holds the clasp 9.

The tray 3 has a base 51 with a centrally mounted rosette 53, which grips and holds the central opening of the compact disc. Segmental walls 55 extend upward from the base to align and hold the CD. The segmental walls have detents 57 on their outward surfaces 59, which cooperate with the arcuate edges 17 of the assembly tabs 7.

Figure 2:
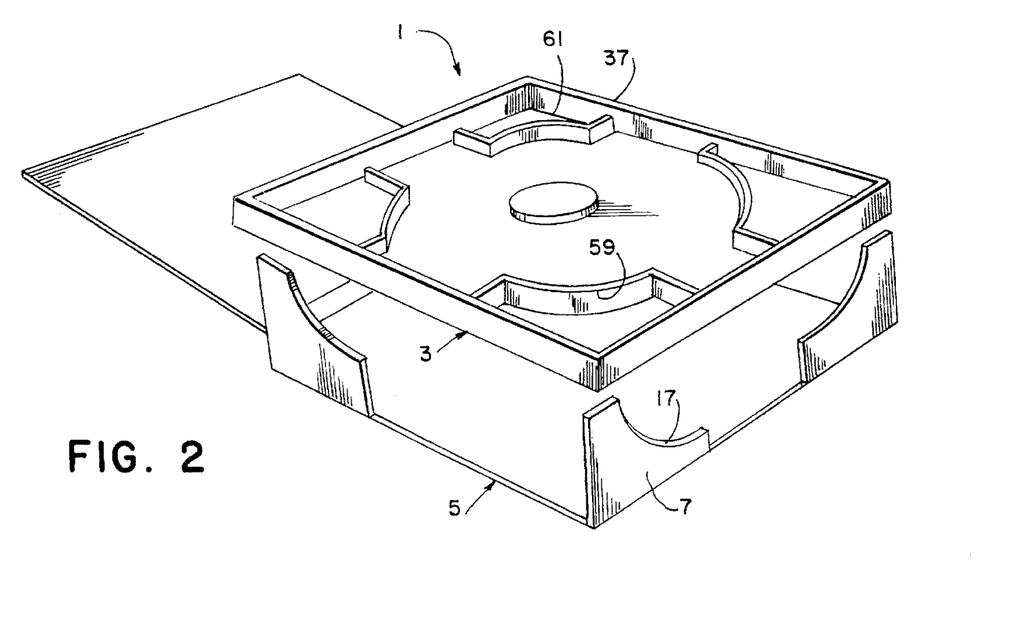
FIG. 2 is a partial assembly detail.

FIG. 2 is an intermediate assembly view of the package 1 showing the bending of the tabs at right angles to be inserted in elongated openings 61 near the corners of the outer walls 37.

Figure 3:
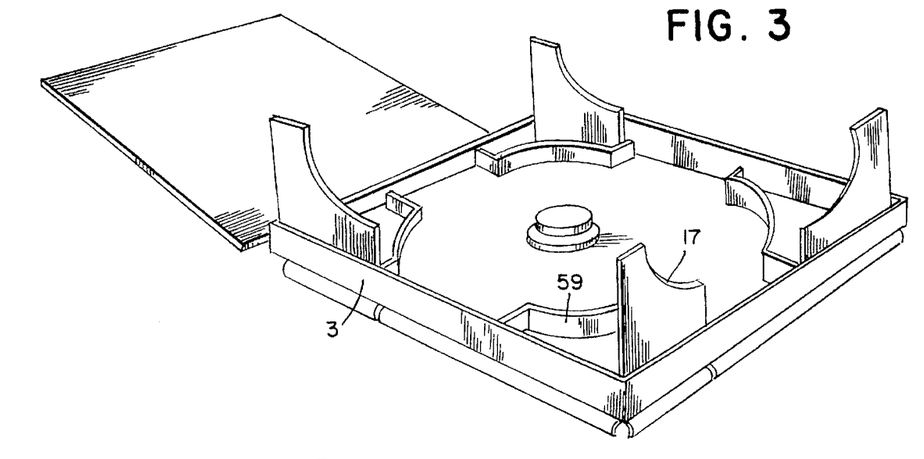
FIG. 3 is a sequential assembly detail.

FIG. 3 is a sequential assembly view in which the tabs have been inserted into the openings of the tray 3.

Figure 4:
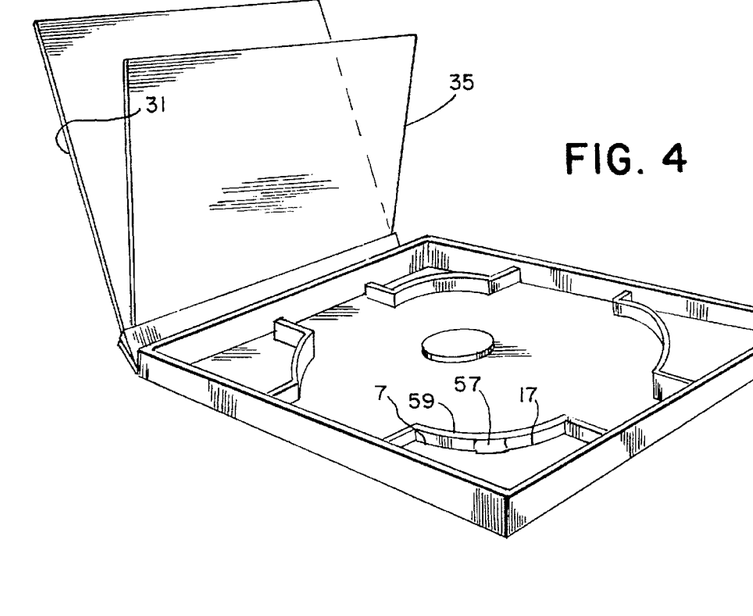
FIG. 4 is a further assembly detail of the package shown in FIG. 1.

FIG. 4 is a final assembly detail in which the tabs 7 have been folded downward so that the arcuate edges 17 lie against the walls 59. The tabs 57 hold the arcuate walls downward and holding the tabs folded.

FIGS. 5–8 are alternate details of the covers.

Figure 5:
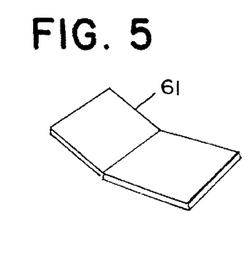
FIGS. 5–8 are details of alternate covers.

FIG. 5 shows a double ply cover 61 in which the inner and outer plys are adhered together.

Figures 6, 7:
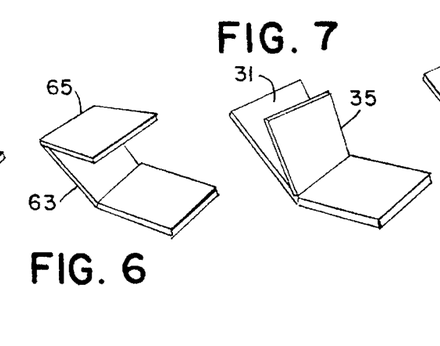

FIG. 6 shows a cover 63 made of four panel in which inner and outer panels are adhered and folded along a fold 65, which will be positioned near the front of the tray when the cover is closed.

FIG. 7 shows the preferred device with the second page 35 folded near the spline edge of the inner panel 31 of the cover to form a spring action to separate the first and second pages and to lift the cover.

Figure 8:
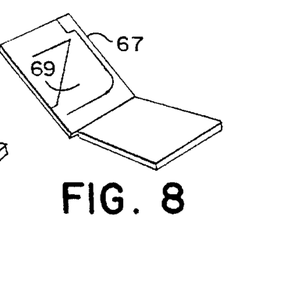

FIG. 8 shows a cover 67 with a pocket 69, which is formed in the inner panel or adhered to the inner panel.

Figures 9, 10:
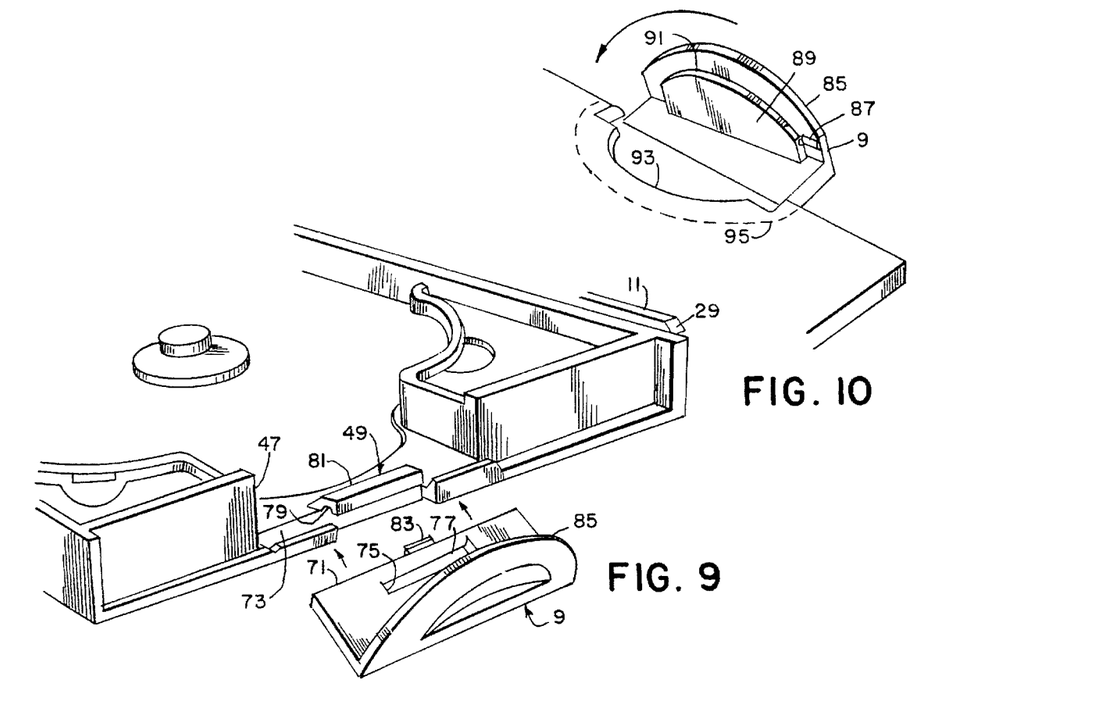
FIG. 9 is an exploded detail of the tray and the clasp.
FIG. 10 is a detail of closing the clasp.
Figure 11:
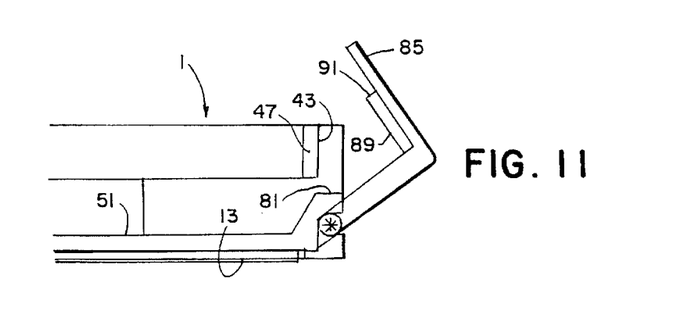
FIG. 11 is a side detail of an alternate clasp in the open position.
Figure 12:
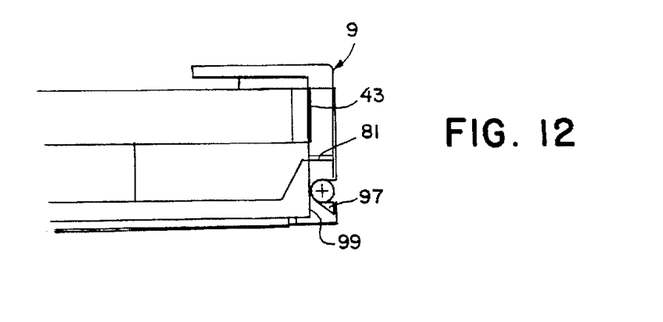
FIG. 12 is a side detail of the clasp of FIG. 11 in the closed position.
Figure 13:
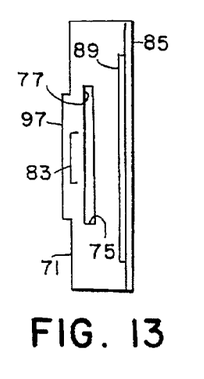
FIG. 13 is an inner side elevation of the clasp shown in FIGS. 11 and 12.
Figure 14:
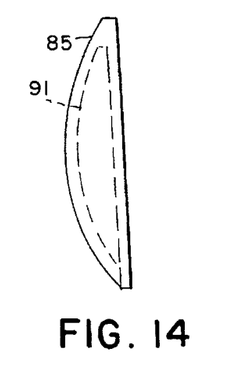
FIG. 14 is a plan view of the clasp shown in FIG. 13.
Figure 15:
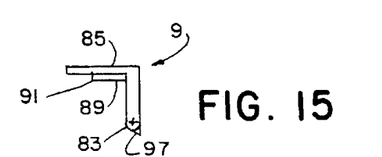
FIG. 15 is a side elevation of the clasp shown in FIGS. 13 and 14.
Figure 16:
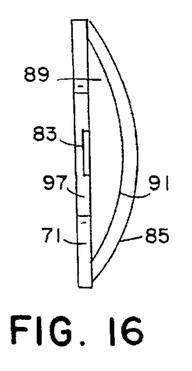
FIG. 16 is a bottom view of the clasp shown in FIGS. 13, 14 and 15.

FIG. 9 is a detail of a pivoted clasp before the clasp 9 is snapped into the receiver 49. Clasp 9 has a rounded lower surface 71 which fits within a rounded groove 73 in the base. Aperture 75 has a rounded lower surface 77 which fits within the rounded groove 79 in the projection 81 at the lower edge of the opening 47. A projecting detent 83 fits within a complementary recess below the projection 81 to hold the clasp 9 in closed position. The rounded lid of the clasp extends over a free edge 29 of the cover 11 when the cover and clasp are closed.

FIG. 10 is a perspective assembled detail of the clasp 9 showing a detent 87 beneath the lid 85, which snaps inside of the top of the front wall when the clasp is closed. The clasp lid 85 preferably has an inner step 89 with a curved outer edge 91, which fits inside of the curved edge 93 of a central cutout in the cover. The central cutout provides a finger access beneath the cover and stabilizes the cover against lateral motion when the clasp 9 is closed. The dashed line 95 shows the extent of the overlay of the peripheral portion of the lid 85 when the clasp is closed.

FIGS. 11–16 show details of a similar clasp with a slight modification. The modification is an extension 97 with a sloped wall at the bottom of the clasp 9. The sloped wall bears against the vertical wall 99 at the bottom of the projection 81 and the front wall 43 to limit the extent of opening of the clasp and to cooperate with the inner edges of the groove 73, as shown in FIG. 9, to prevent lateral motion of the clasp as it is opened and closed.

Figures 17, 18:
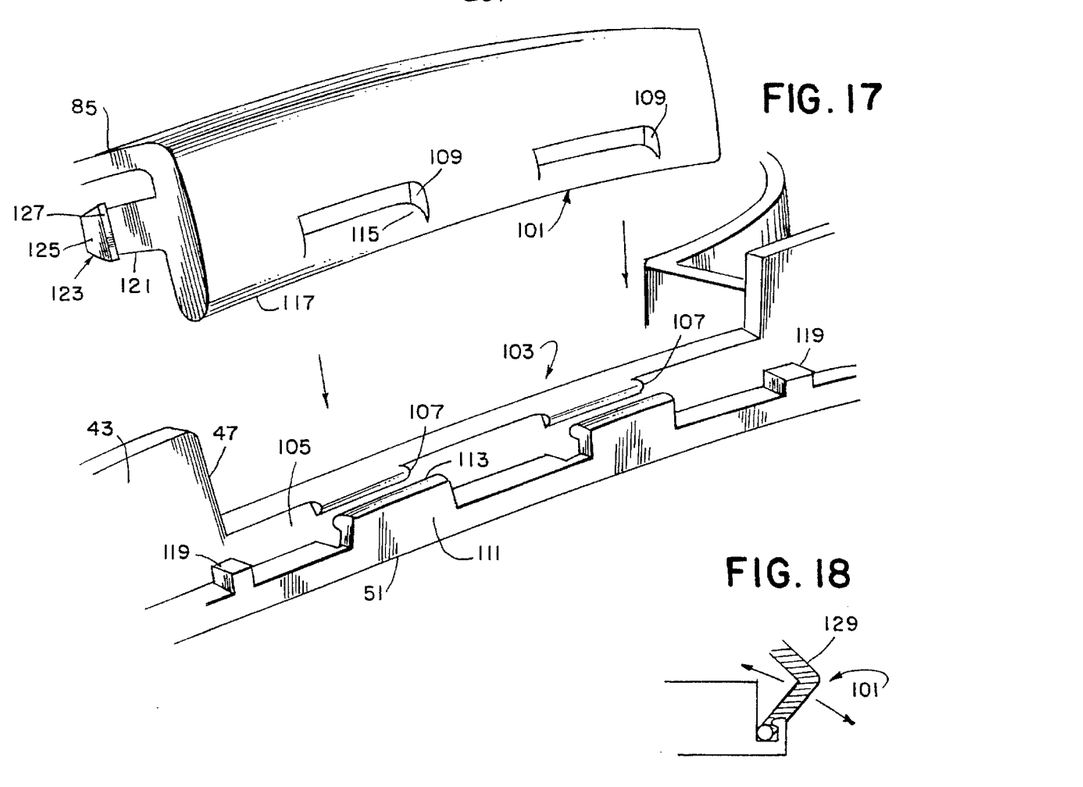
FIG. 17 is an exploded detail of an alternate clasp.
FIG. 18 is an assembled detail of the clasp shown in FIG. 17.
Figure 19:
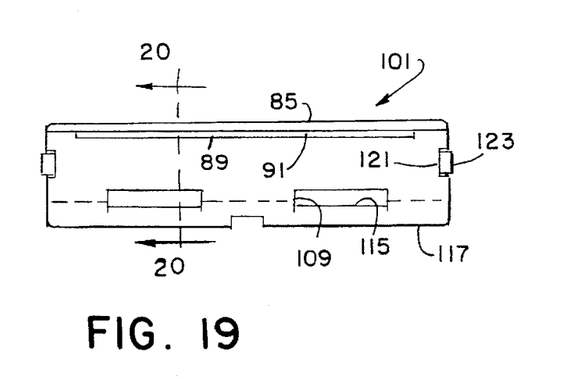
FIG. 19 is an inside elevation of the clasp shown in FIGS. 17 and 18.
Figure 20:
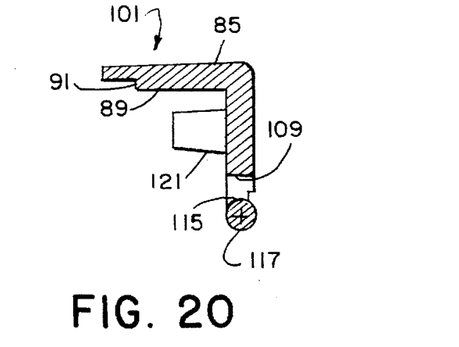
FIG. 20 is a cross-sectional view of the clasp taken along line 20–20 of FIG. 19.
Figure 21:
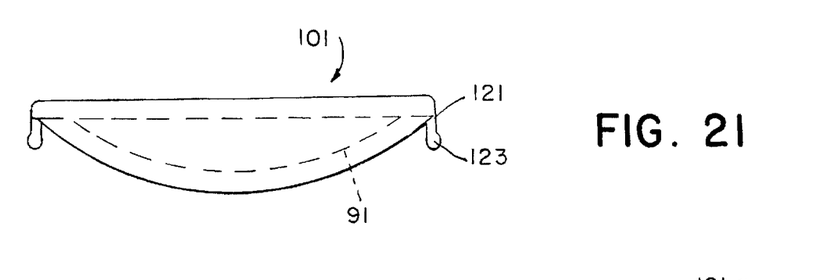
FIG. 21 is a top plan of the clasp shown in FIG. 19.
Figure 22:
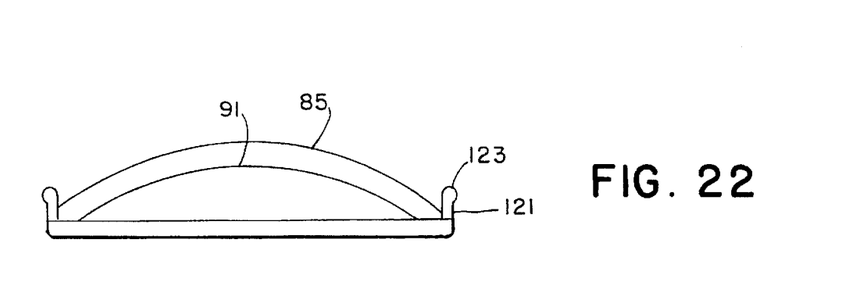
FIG. 22 is a bottom view of the clasp shown in FIGS. 19, 20 and 21.

FIGS. 17 and 18 show details of an alternate clasp 101, which is snapped into place by vertically loading the clasp downward into a receiver 103 in the tray. The lower portion 105 of the front wall 43 along the bottom edge of the opening 47 has projections 107 which fit into the openings 109 in the clasp 101. The base 51 of the tray has upward projections 111 with rounded inner surfaces 113, which also fit within the openings 109 in the clasp 101. The lower surfaces 115 of the openings 109 are rounded to permit rotational movement of the clasp 101 and the projections 107 and 113. The lower surface 117 of the clasp is rounded to facilitate the rotational movement of the clasp in the upward opening groove in the base extension. Stops 119 are positioned on the forward extension of base 51 of the tray to prevent lateral movement of the clasp 101 when it is opened. Arms 121 project forward on opposite sides of the clasp to fit within the opening 47. Lugs 123 with sloped ramps 125 and stop walls 127 allow the lugs to be inserted beyond the front walls 43, and then to rest against inner surfaces of the front walls to prevent excessive outward rotation of the clasp. The lid 85 is similar to the lid 85 shown in FIGS. 9–16.

FIGS. 19–23 show projections of the lid shown in FIG. 17 perspectively from the inside, from the top, from cross-sectional view, from the bottom, and from the outside which has been inverted in the orthographic projection.

Figure 23:
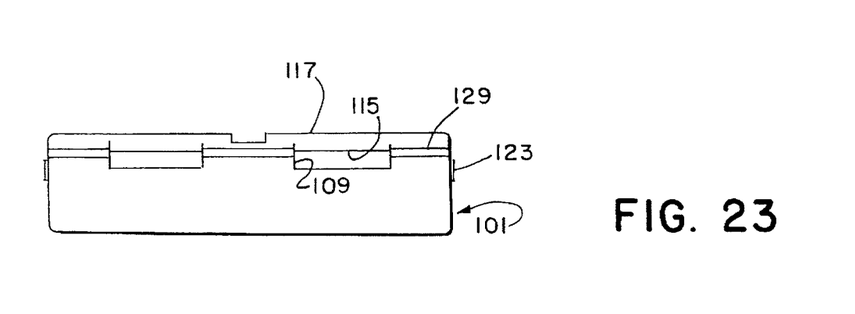
FIG. 23 is an outside inverted elevation of the clasp shown in FIGS. 19, 20, 21 and 22.

As shown in FIG. 23, a groove 129 extends horizontally across the outer face of the clasp 101.

Figure 24:
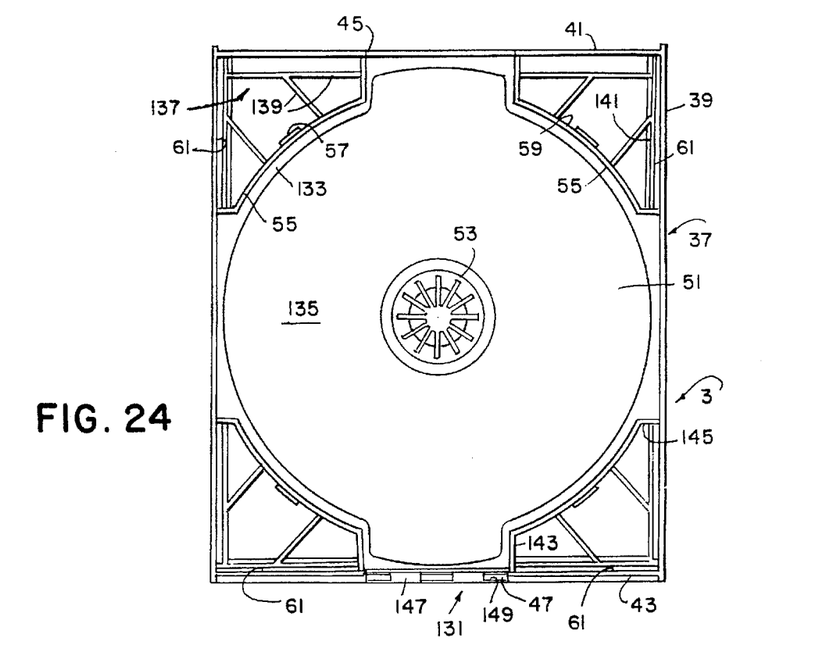
FIG. 24 is a top plan view of a preferred tray.
Figure 25:
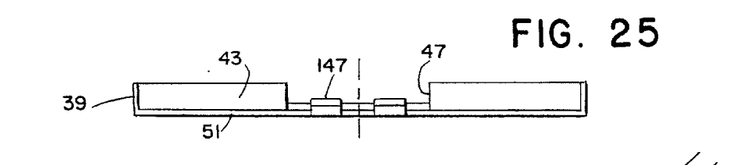
FIG. 25 is a front elevation of the tray shown in FIG. 24.

A preferred tray 3 with a modified clasp receiver 131 is shown in FIGS. 24 and 25. The tray has outer walls 37, which include side walls 39, rear wall 41 and front wall 43 with openings 45 and 47 in the rear or spline wall 41 and the front wall 43 respectively. The tray has a base 51 and a central rosette 53, which retains a compact disc. A slightly raised area 133 around the flat central area 135 supports the peripheral area of the compact disc. Corners 137 have ribs 139 which terminate below the upward extension of arcuate walls 55 to form a surface for receiving the inner portions of the tabs and holding the tabs beneath the detents 57. Openings 61 receive the tabs before the tabs are bent around the outer ribs 141 to overlie the internal ribs 139 so that the arcuate edges 17 may rest against the inside surfaces 59 of the segmental walls 55. As shown, the openings 61 are oriented parallel to the side walls 39 near the spline and parallel to the front wall 43 to accommodate the orienting of the tabs. The long walls 19 of the tabs rest against the inside of the outer walls 37, while the short walls 18 of the tabs rest against the short interior walls 143 and 145, which lead to the front wall 43 and side walls 39, respectively.

The receivers 131 are formed by curved outward projections 147, which extend upward and forward from the forward portion of the base 51, and by a groove 149 which extends along the top surface of the base within an area defined by opening 47 to receive a clasp similar to the tabs shown in FIGS. 17-23.

Figures 26, 27, 28:
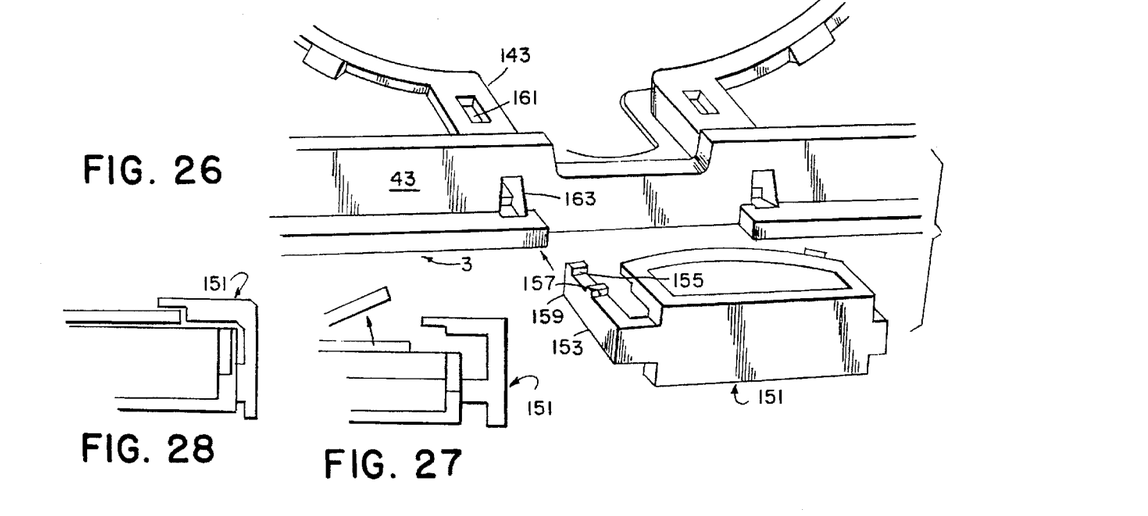
FIG. 26 is a detail of an alternate clasp and tray.
FIG. 27 is a detail of the clasp and tray shown in FIG. 26 in open position.
FIG. 28 is a detail of the clasp and tray shown in FIGS 26 and 27 in the closed position.

FIGS. 26-28 show an alternate slide-in slide-out clasp 151. Arms 153 have distal lugs 155, which prevent disassembly of the clasp 151 once assembled with the tray 3. Smaller lugs 157 cooperate with the inside of the front wall 43 to hold the clasp closed but to permit sliding of the clasp upward to open the package. Downward extending lugs 159 cooperate with upward facing recesses 161 in walls 143 to limit travel of the clasp 151.

The arms 153 fit within auxiliary recesses 163 in the front wall 43 of the tray. The lid 85 is similar to the lids of the other clasps shown. In the slide-out position as shown in FIG. 27, the clasp allows opening of the cover. In the slide-in position of the clasp, the round lid overlies the area adjacent the lid recess to hold the clasp package closed.

The present invention provides a unique paperboard and plastic tray package for compact discs.

While the invention has been described with reference to specific embodiments, modifications and variations of the invention may be constructed without departing from the scope of the invention, which is defined in the following claims.

We claim:

1. A CD package apparatus, comprising a molded plastic tray, a paperboard having a base panel attached to the tray, a spline panel overlying an end of the tray and a cover panel overlying the tray, and a clasp connected to a front of the tray for engaging a front edge portion of the cover panel and holding the panel cover closed, wherein the tray further comprises a base and outer walls extending upward from the base, and segmental inner walls extending upward from the base near intersections of the outer walls, the segmental walls defining a generally circular area for receiving a compact disc, and openings in the base for receiving portions of the paperboard and detents on the segmental wall for engaging the portions of the paperboard.

2. The apparatus of claim 1, wherein the outer walls comprise opposite spline and front walls, and opposite openings in the spline and front walls for access to edges of compact discs stored in the tray.

3. The apparatus of claim 2, further comprising the clasp being attached to the front wall at the opening therein and being movable to a position generally closing the opening and engaging a portion of a front edge of a graphics card covering the tray.

4. The apparatus of claim 3, wherein the front wall of the tray has two auxiliary arm-receiving openings, and the clasp has two forward extending arms which extend into the arm-receiving openings, and further comprising ramped primary knobs at distal ends of the arms for preventing removal of the clasp from the openings, and secondary knobs on intermediate portions of the arms for holding the arms inward when the clasp is closed and for permitting the arms to slide outward until the primary knobs contact the tray around the openings for opening the clasp.

5. The apparatus of claim 4, further comprising auxiliary walls extending between the outer walls and the segmental walls around the front wall opening, and primary detents in the auxiliary walls and secondary detents on ends of the arms for engaging the primary detents for limiting travel of the arms.

6. The apparatus of claim 3, wherein the clasp has a base and an aperture parallel to the base, and wherein the tray has a projection which fits in the aperture and traps the aperture while permitting rotation with respect to the base, wherein the tray has a groove, the clasp has a rounded base for fitting within the groove for pivoting of the clasp within the groove.

7. The apparatus of claim 2, wherein the clasp is pivoted at an intersection of the base panel and the front wall of the tray, and wherein the clasp has parallel arms which extend into the front wall opening and ramped knobs extending outward from extremities of the arms for grasping an inside of the front wall adjacent to the front wall opening when the clasp is pivoted upward to close the front wall opening.

8. The apparatus of claim 7, wherein the clasp is sized to fit entirely within the front wall opening for pivotally rotating the clasp inward in the tray and for positioning the clasp entirely beneath an upper limit of the tray.

9. A CD package apparatus, comprising a molded plastic tray, a paperboard having a base panel attached to the tray, a spline panel overlying an end of the tray and a cover panel overlying the tray, and a clasp connected to a front of the tray for engaging a front edge portion of the cover panel and holding the cover panel closed, wherein the base panel further comprises tab extensions with folds for extending into openings in the tray and folding within the tray for mechanically attaching the base panel to the tray, the paperboard further having a spline panel connected to a spline edge of the base panel and a cover connected to a top edge of the spline panel.

10. The apparatus of claim 9, wherein the base panel tab extensions have arcuate terminal edges for engaging segmental walls of the tray on an inside of the tray.

11. The apparatus of claim 10, wherein the extensions have opposite long and short parallel edges for respectively lying along inner surfaces of outer walls of the tray and surfaces of internal walls in the tray.

12. The apparatus of claim 9, wherein the cover has an outer panel and an inner panel joined by a fold parallel to and opposite the fold at the top of the spline panel, and wherein the outer and inner panels of the cover panel are permanently joined together forming a first page.

13. The apparatus of claim 12, further comprising a second page connected to the inner panel along an edge thereof near the fold at the top of the spline panel so that the second page and the inner panel of the cover panel separate and relatively move outward by spring action as the cover panel is released.

14. The apparatus of claim 13, wherein the cover and inner panel and second page have lateral edges, and wherein lateral edges of the inner panel and second page are inset from lateral edges of the outer panel of the cover to fit within side walls of a tray.

15. The apparatus of claim 12, wherein the fold between the outer and inner panels of the cover panel, which is remote from the fold at the top edge of the spline panel, has a central curvilinear cutout portion for receiving an inner complementary curvilinear portion of a clasp.

16. A CD tray having a base and outer walls extending upward from the base, and segmental inner walls extending upward from the base near locations where the outer walls meet, the segmental walls defining a generally circular area for receiving a compact disc, and openings in the base for receiving inserts and detents on the segmental wall for engaging the inserts.

17. The tray of claim 16, wherein the outer walls comprise opposite spline and front walls, and opposite openings in the spline and front walls for grasping edges of compact discs stored in the tray, a clasp attached to the front wall at the opening therein and movable to a position generally closing the opening and engaging a portion of a front edge of a graphics card covering the tray, wherein the clasp is movable with respect to the front wall of the tray, and wherein the clasp has at least one detent which cooperates with the front wall to hold the clasp closed.

18. A cover apparatus for a combined plastic tray and paperboard panel CD package, comprising a spline panel, an outer panel joined to a fold at a top of the spline panel, an inner panel folded with respect to the outer panel remote from the spline panel and bonded to an inner surface of the outer panel to form a first page, and a second page hinged to the inner panel along an edge thereof near the spline panel for providing a spring action for lifting the outer panel the cover and separating the second page from the inner panel as the outer panel is lifted.

19. A paperboard panel apparatus for a combination of a paperboard and a plastic tray CD package comprising a base panel for mechanically engaging the tray, the base panel having tab extensions with folds for extending into openings in the tray and folding within the tray for mechanically attaching the base panel to the tray, the paperboard further having a spline panel connected to a spline edge of the base panel and a cover connected to a top edge of the spline panel, the tray having outer walls with inner surfaces, wherein the base tab extensions have arcuate terminal edges for engaging segmental walls of the tray on an inside of the tray, and wherein the extensions have opposite parallel edges for respectively lying along inner surfaces of outer walls of the tray and surfaces of the segmental walls in the tray.

* * * * *